United States Patent [19]
Harbour

[11] Patent Number: 4,904,071
[45] Date of Patent: Feb. 27, 1990

[54] EQUATORIAL MOUNTING SYSTEM AND DRIVE THEREFOR

[76] Inventor: David A. Harbour, P.O. Box 6081, Enid, Okla. 73702-6081

[21] Appl. No.: 259,972

[22] Filed: Oct. 18, 1988

[51] Int. Cl.⁴ ............................................ G02B 23/16
[52] U.S. Cl. .................................................. 350/568
[58] Field of Search ...................... 350/537, 567, 568; 74/89.13, 89.14, 10.85, 214, 215

[56] References Cited

U.S. PATENT DOCUMENTS

| | | | |
|---|---|---|---|
| 2,003,171 | 5/1935 | Burrell | 350/568 |
| 4,277,132 | 7/1981 | Hansen | 350/568 |
| 4,317,612 | 3/1982 | Horvath | 350/568 |
| 4,400,066 | 8/1983 | Byers | 350/568 |
| 4,541,294 | 9/1985 | Byers | 350/568 X |
| 4,709,178 | 11/1987 | Burr | 350/568 X |

FOREIGN PATENT DOCUMENTS 1120736 12/1961 Fed. Rep. of Germany ...... 350/568

OTHER PUBLICATIONS

Gray et al., "The 45 cm Telescope at Wollongone University College", Journal of the British Astronomical Association, vol. 81, No. 3 (1971), pp. 211–214.

Primary Examiner—Bruce Y. Arnold
Assistant Examiner—Martin Lerner
Attorney, Agent, or Firm—Richard K. Thomson

[57] ABSTRACT

An equatorial mount for optical instruments that affords quick setup. A safety trunnion which receives any of a plurality of pairs of declination studs on the telescope or camera is provided with a safety access channel that has a first vertical segment and a second angulated segment forming a crook therebetween. In the event the trunnion assumes an inverted position, the declination studs will slide into the crook between the two segments and be retained in the equatorial mount by the angulated segment. The plurality of pairs of studs permit the instrument to be rotated about its longitudinal axis and reinserted should the eyepiece or viewing lens be positioned at an inconvenient angle. A guided sector drive provides an inexpensive device for driving the equatorial mount in right ascension to track a celestial body.

20 Claims, 2 Drawing Sheets

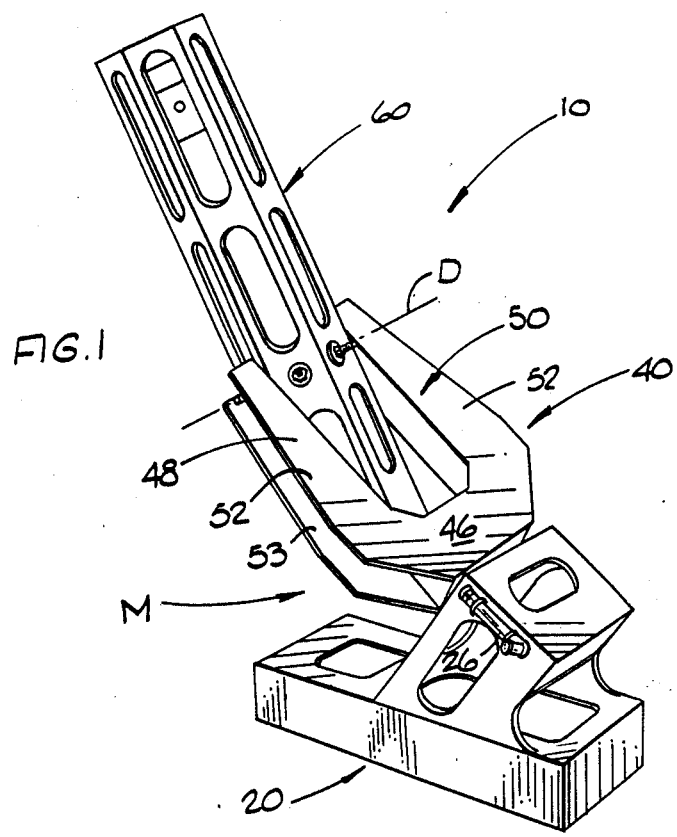
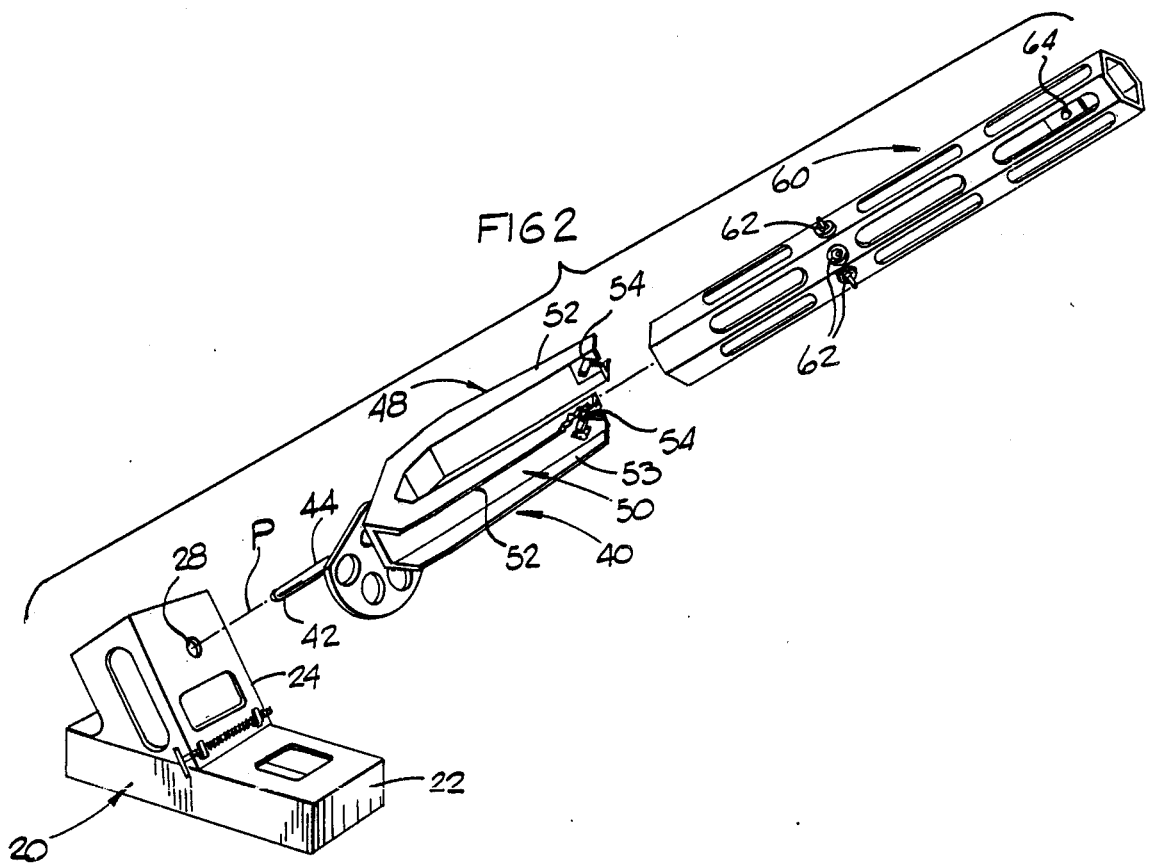

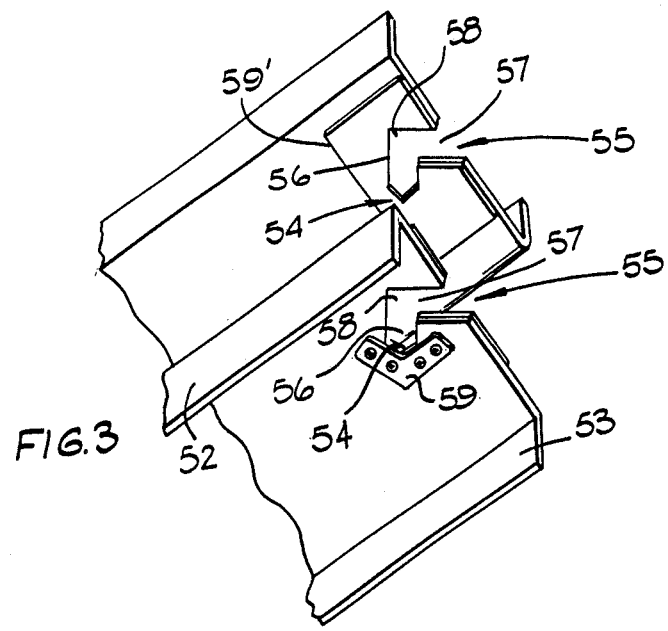
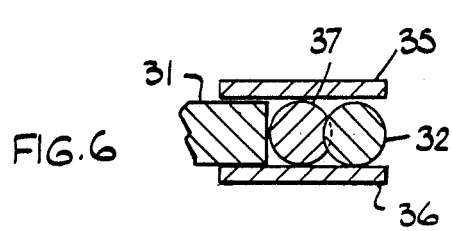
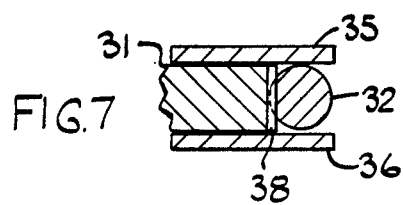
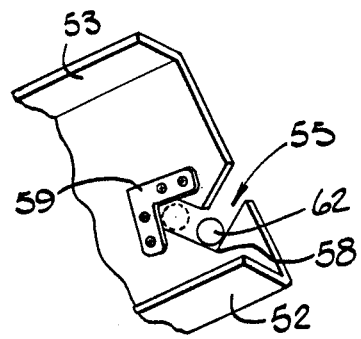
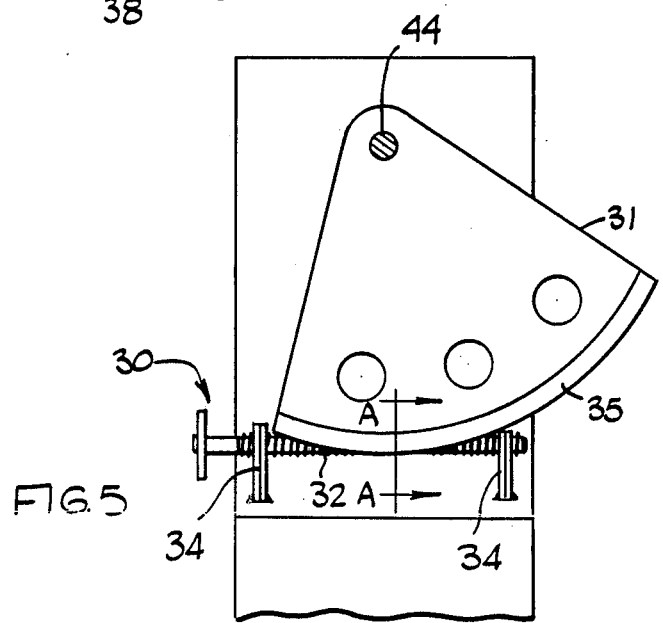

EQUATORIAL MOUNTING SYSTEM AND DRIVE THEREFOR

BACKGROUND AND SUMMARY OF THE INVENTION

The present invention is in the field of of optical instrumentation. More particularly, the present invention is directed to an improved mounting and drive apparatus for use with astronomical instruments, such as telescopes and cameras, when viewing or optically recording celestial bodies.

There are two basic types of telescope mounts: altazimuth and equatorial. Both types have two orthogonal axes of rotation. In the altazimuth mount, as the name implies, a first axis is horizontal and permits altitude to be adjusted by pivoting thereabout and a second axis is vertical, which permits the azimuth to be selected. In the equatorial mount, a first or polar axis is parallel to the earth's axis (made so by inclining it to the horizontal by an angle equal to the latitude of the viewer) and the second declination axis permits adjustment of the angle of inclination. Tracking of a celestial object is very difficult with the altazimuth mount, requiring complicated (and therefore expensive) drive apparatus to coordinate the complex multiplanar motions. The equatorial mount makes celestial tracking much simpler: the object is located, the declination axis fixed, and the optical instrument rotated about the polar axis in a direction opposite to, and at a rate equal to the rate of, the earth's rotation. This is known as driving the telescope in right ascension (so known for the path followed by the light receiving end of the instrument).

Because of the simplicity of tracking with the equatorial mount, it is used on virtually all professional telescopes and a good many of the amateur instruments, as well. However, due to the comparitive ease of setup, some amateur astronomers still prefer the altazimuth to the equatorial mount. Typically, the equatorial mount is complicated by the need to lock the optical instrument into the mount to prevent possible dropping of the instrument as the mount rotates about the polar axis. These securement or locking means increase setup and takedown for the optical instrument. Further, the worm gears typically used in the equatorial drive systems are relatively expensive making them less accessible to many amateur astronomers. Finally, the rotation of the equatorial mount about the polar axis sometimes produces an inconvenient or even inaccessible location for the eyepiece lens.

The present improved mounting and drive system for optical instruments solves these problems. A safety trunnion turns a mount suitable for use in an equatorial system. A V-shaped trunnion has an entrance channel which has a first component that extends generally vertically and a second component that is angulated downwardly relative to the first forming a crook at the juncture and an angle with the first component preferably between 75° and 135°. In the event the trunnion becomes inverted as a result of a rotation of the mounting bracket about the polar axis, the mounting studs will slip down into the crook and the second (now upwardly extending) component of the entrance channel will retain the optical instrument in the mounting bracket.

The cross section of the optical instrument is configured as a polygon, preferably a hexagon, with a declination mounting stud protruding from each face. Declination studs protruding from opposing faces provide mounting pairs pivotally received in the trunnion. Should any particular pair of declination studs provide an inconvenient viewing angle, the instrument may be readily lifted out of the trunnion and rotated so that the eyepiece occupies a more convenient location and the appropriate pair of declination studs quickly and easily reinserted in the safety trunnion.

Lastly, a guided sector drive having a linear threaded drive rod provides an inexpensive drive mechanism for slewing the optical instrument in right assention to track a celestial object. A pair of curved lateral guides keep the driven surface of the sector in contact with the drive rod. The driven surface may comprise a curved, threaded rod section that is attached to the end of the sector or an impressionable coating material bonded thereto. The impressionable coating material may comprise an epoxy, an adhesive tape, or the like. Other features, advantages, and characteristics of the present invention will become apparent after a reading of the following detailed description.

BRIEF DESCRIPTION OF THE DRAWINGS

FIG. 1 is a perspective view of an optical instrument utilizing the equatorial mount of the present invention;

FIG. 2 is an exploded perspective view of the instrument shown in FIG. 1;

FIG. 3 is a detailed perspective view showing the safety trunnion of the present invention;

FIG. 4 is a lateral view of the safety trunnion showing FIG. 3 depicted here in an inverted position;

FIG. 5 is a detailed front view of the drive sector of the present invention;

FIG. 6 is a cross-sectional side view taken along line A—A of FIG. 5 of a first embodiment of the guided sector of the present invention; and FIG. 7 is a cross-sectional side view similar to FIG. 6 of a second embodiment.

DETAILED DESCRIPTION OF THE PREFERRED EMBODIMENTS

The telescope assembly which embodies the improved equatorial mount M of the present invention is shown in FIGS. 1 and 2 generally at 10. The telescope assembly 10 comprises three basic components: The generally fixed base 20, a V-shaped fork or support member 40, and the telescope 60. It will be understood that other optical instruments such as cameras could also be used in the assembly, but for ease of reference, the term telescope will be utilized.

Base 20 has a first generally horizontal portion 22 and a second angulated portion 24. The angulated portion will hold the pivot axle 44 at an angle with the base generally equal to the latitude of usage of the telescope 60. The latitudes of the continental United States vary from 30° tO 45° north. As a practical matter, it is not possible to make a different base for each latitude. Accordingly, it is preferred that the base be manufactured with two different base angles of 35° and 45° and the base shimmed as necessary. For the purpose of initial setup a sighting scope 26 may be affixed to the base 20 or, as is more conventional, to the telescope 60. Wedges (not shown) can be attached to the appropriate end as necessary to provide the inclination to the base that is needed to make the polar axis P rotate parallel to the earth's rotational axis. This will usually be done by aligning the sighting scope 26 with the North star (Polaris). A cylindrical opening 28 is formed in angulated portion 24 and bearings (not shown) rotationally receive the end 42 of pivot axle 44 of support member 40 which should lie along and serve as polar axis P for the equatorial mount M.

U-shaped support member 40 defines a trough 46 with two parallel mounting arms 48 and 50 extending upwardly therefrom. Mounting arms 48 and 50 have laterally outwardly extending upper (52) and lower (53) flanges provided for structural reinforcement. Pivot axle 44 is mounted in rotary bearings (not shown) secured in the trough 46 of U-shaped support 40. The outward ends of mounting arms 48 and 50 are each provided with a safety trunnion generally indicated at 54. As shown in greater detail in FIG. 3, safety trunnion 54 is preferably V-shaped to provide two-point contact for the declination studs 62 on telescope 60. Trunnion 54 can be accessed by safety channel 55 which has a first generally vertically extending component 56 and a second angulated component 57.

Trunnions 54 will be situated on mounting arms 48 and 50 so that they will be substantially bisected by a vertically extending plane (plus or minus 5°) to insure proper pivoting action of declination studs 62. The second angulated component 57 is shown in its preferred configuration formed at a right angle to first component 56 forming a crook therebetween. However, second component 57 may form any angle in the range of from about 70° to about 135°. Trunnions 54 may be reinforced using either of two methods: a V-shaped bracket 59 may be secured to either lateral face of mounting arms 48 and 50, or a thin gauge metal plate 59' with an outline mirroring the shape of safety channel 55 can be similarly situated relative to either lateral face of arms 48 and 50. In either case, the metal member 59 or 59' will provide two-line contact for declination studs 62. Trunnion 54 will be generally bisected by first portion 56 of safety channel 55. As shown in FIG. 4, should the equatorial mount M assume a generally inverted position as a result of tracking a celestial object located low along the horizon, the declination studs 62 will slide out of trunnion 54 (ghost position in FIG. 4) into the crook 58 between first component 56 and second component 57 of safety channel 55. The now upwardly inclined component 57 of safety trunnion 54 avoids the possibility of equatorial mount 10 dropping the telelscope 60 on the ground.

Preferably, telescope 60 has a polygonal configuration depicted in the figures as a hexagon. Each face of the hexagon has a declination stud 62 protruding therefrom. In the event eyepiece 64 arrives in an inconvenient viewing position during tracking in right ascension, the pair of declination studs 62 then positioned along the declination axis D, may be easily slid out of safety channel 55, the telescope 60 rotated to position the eyepiece at a more convenient viewing angle (in the case of the hexagon, this rotation is performed in increments of 60°), and the appropriate pair of declination studs 62 reinserted in safety channel 55.

A drive mechanism for equatorial mount M identified as the "guided sector" as shown in detail in FIGS. 5-7 generally at 30. Sector 31 is nonrotatably attached to pivot axle 44. Alternatively, the sector 31 may be frictionally slip driven by axle 44 and U-shaped support member 40 fixed to pivot axle 44. A threaded rod 32 is mounted near the bottom of angulated portion 24 of base 20 by a pair of angle brackets 34. Threaded rod 32 is provided with an enlarged knurled end portion that may be manually operated or connected to a motor (not shown). A pair of curved guides 35 and 36 are positioned to extend from the upper and lower surfaces, respectively, of sector 31.

In the first preferred embodiment (FIG. 6), a curved, threaded rod section 37 is secured to the arcuate periphery of sector 31 and is threadingly engaged and driven by threaded rod 32. A second preferred embodiment is depicted in FIG. 7. Applicant has found that for smaller, light-weight optical instruments, an adequate, inexpensive drive may be afforded by permitting the threaded rod 32 to engage an impressionable friction drive surface 38 coated on, or otherwise secured to, the arcuate periphery of sector 31. The threads on rod 32 form their own mating threads on friction drive surface 38. Curved guides 35 and 36 preferably extend far enough past the arcuate periphery of sector 30 to enclose at least half the diameter of threaded rod 32 and more particularly its full diameter. In this manner, curved guides 35 and 36 prevent walking up or down of sector 31 on drive rod 32 ensuring proper driving engagement with rod section 37 or friction drive surface 38.

To facilitate celestial tracking, the radius of rotation of sector 30 (and hence its circumference) and the thread pitch on rod 32 are selected such that they are interrelated to permit one r.p.m. of said threaded rod 32 to maintain a substantially uniform field of view for telescope 60.

There are sustantially 1436 minutes in a sidereal day (that is, the time it takes for a celestial object to "move" from a point in the heavens to substantially the same point the following evening). Since it is desired that a single revolution of drive rod 32 each minute adequately adjust the equatorial mount M to maintain the same field of view of telescope 60, the circumference of the circle from which sector 31 is taken must be a multiple of both 1436 and the spacing of the threads. For a thread pitch of 20 threads per inch, for example, the required circumference is 71.8 inches or a circle having a radius of 11.43 inches.

The mounting bracket 40 is mounted on pivot shaft 44 by means of a friction drive (not shown). When the sector 31 has been driven as far as possible on a single pass, the rod 32 is disengaged, the arms 48 and 50 held in position, and sector 31 recycled for another pass. A friction pad (not shown) is mounted on the interior of one or both arms 48 and 50 adjacent safety channels 55 in position to engage the exterior of the body of telescope 60. These friction pads ensure the telescope maintains the desired declination angle. pivoting about declination studs 62 only when the operator desires. Alternatively, the declination studs 62 may be threaded and wing nuts threaded thereon, engaging the outward surfaces of mounting arms 48 and 50 to retain the telescope at the desired angle. Cut out portions have been provided wherever possible on the base and telescope. These cut outs serve both a decorative purpose as well as a functional one: the removal of material can substantially reduce weight.

The improved equatorial mount and drive of the present invention provide a safety trunnion with simplicity and ease of setup, a quick and easy method of correcting an awkwardly positioned eyepiece and an equatorial drive which is inexpensive yet, effective.

Various changes, alternatives, and modifications will become apparent to a person of ordinary skill in the art following a reading of the foregoing specification. Accordingly, it is intended that all such changes, alternatives, and modifications as come within the scope of the appended claims, be considered part of the present invention.

I claim:

1. An improved equatorial mount for a piece of optical equipment comprising:
    a substantially stationary base;
    a U-shaped member defining a trough and a pair of parallel mounting arms;
    an axle pivotably mounted in said base, said axle mounting said U-shaped member and forming an angle measured from a horizontal reference line that is substantially equal to a latitude of utilization of said optical equipment, said axle thereby lying along and defining a polar axis;
    at least one pair of opposed declination studs protruding from opposite sides of said optical equipment; mounting means positioned on each of said parallel mounting arms for receiving said at least one pair of opposing declination studs, said mounting means including a V-shaped trunnion which is substantially bisected by a vertically extending plane when said mounting arms are equidistant from a horizontal plane, a safety channel for permitting one of said opposing declination studs access to said trunnion, said channel having a first component which substantially bisects said V-shaped trunnion, and a second component angulated relative to said first and forming a crook at an intersection therewith;
    whereby, in the event said mounting arms become generally inverted, said pair of opposing declination studs which are seated in said V-shaped trunnion will slide into said crook and be retained in said mounting arms by said angulated component of said safety channel.

2. The equatorial mount of claim 1 wherein said second angulated component of said safety channel forms an angle with respect to said first component in a range from about 75° to about 135°.

3. The equatorial mount of claim 1 wherein said at least one pair of opposing declination studs comprises a plurality of pairs of opposing declination studs.

4. The equatorial mount of claim 3 wherein said piece of optical equipment comprises a telescope with a polygonal tubular body and a declination stud protruding from each polygonal face.

5. The equatorial mount of claim 4 wherein said telescope comprises a a generally hexagonal tubular body with three sets of opposing pairs of declination studs.

6. The equatorial mount of claim 1 further comprising drive means for slewing said piece of optical equipment about said polar axis in a direction opposite to the direction of rotation of the earth at such a rate so as to maintain a field of view of said piece of optical equipment substantially fixed.

7. The equatorial mount of claim 6 wherein said drive means comprises a threaded rod engaging between a pair of curved guides, said curved guides being positioned adjacent a periphery of an arcuate sector which is fixedly attached to the axle mounting said U-shaped member.

8. The equatorial mount of claim 7 wherein said curved guides enclose at least one half of a diametrical dimension of said threaded rod.

9. The equatorial mount of claim 8 wherein said curved guides more preferably enclose the entire diametrical dimension of said threaded rod.

10. The equatorial mount of claim 7 wherein said threaded rod of said drive means engages a curved threaded rod section fixedly attached to the edge of said arcuate sector between said curved guides.

11. The equatorial mount of claim 7 wherein said threaded rod engages an impressionable drive surface which is affixed to the periphery of said arcuate sector between said curved guides.

12. The equatorial mount of claim 7 wherein a thread pitch of said threaded rod of said drive means and a radius of said arcuate sector are related in such a manner that a rate of rotation of said threaded rod of one revolution per minute will substantially fix the field of view of said optical instrument.

13. An equatorial mounting system for a telescope, or the like, comprising:
    a substantially stationary base member;
    a U-shaped element defining a trough and a pair of parallel mounting arms extending upwardly therefrom;
    an axle pivotably mounted in said base, said axle mounting said U-shaped member and forming an angle measured from a horizontal reference line that is substantially equal to a latitude of utilization of said telescope, said axle thereby lying along and defining a polar axis;
    said telescope comprising a polygonal tubular housing having a plurality of pairs of declination studs protruding from opposed polygonal sides;
    mounting means for slidably receiving an opposing pair of declination studs;
    whereby said telescope may be quickly assembled to said equatorial mount and in the event of an inconvenient positioning of an eyepiece lens, said declination studs of said telescope may be easily removed from said mounting means, axially rotated and another pair of said declination studs slidably inserted into said mounting means to more conveniently position said eyepiece lens.

14. The equatorial mounting system of claim 13 wherein said mounting means which is positioned upon each of said parallel mounting arms comprises a V-shaped trunnion which is substantially bisected by a vertically extending plane when said mounting arms are oriented parallel to a horizontal plane.

15. The equatorial mounting system of claim 14 wherein said mounting means further comprises a safety channel for permitting one of said declination studs to have access to said V-shaped trunnion, said channel having a first leg portion which substantially bisects said V-shaped trunnion and a second leg portion angulated relative to said first portion and defining a knee at the intersection of said first and second leg portions.

16. A drive system for slewing an equatorial mount about its polar axis to track a celestial body, said equatorial mount including a substantially stationary base, a U-shaped member defining a trough and a pair of mounting arms extending outwardly therefrom for each receiving a mounting stud secured to an optical instrument, said mounting studs defining a declination axis, and an axle lying along said polar axis pivotably mounting said U-shaped member to said base, said drive system comprising:
    an arcuate sector fixedly connected to said axle which lies along said polar axis and to the trough of said U-shaped member;
    a threaded rod rotatably mounted on said substantially stationary base;

friction means secured to an end of said arcuate member and engaged by said threaded rod to be driven thereby;

a pair of curved guides mounted adjacent a curved periphery of said arcuate sector, said curved guides enclosing at least a portion of said threaded rod.

17. The drive system of claim 16 wherein said threaded rod has a thread pitch related to a radius of rotation of said arcuate sector such that a rate of rotation of said threaded rod of one revolution per minute is sufficient to maintain a substantially uniform field of view of said optical instrument.

18. The drive system of claim 16 wherein said friction means comprises a curved threaded rod section secured to the edge of said arcuate sector between said curved guides.

19. The drive system of claim 16 wherein said friction means comprises an impressionable drive surface which is engaged by and has threads formed therein by said threaded rod.

20. The drive system of claim 16 wherein said pair of curved guides enclosed substantially all of a diametrical dimension of said threaded rod.

* * * * *